US012396053B2

(12) United States Patent
Jang et al.

(10) Patent No.: US 12,396,053 B2
(45) Date of Patent: Aug. 19, 2025

(54) METHOD AND DEVICE FOR DRIVING TIMERS ACCORDING TO BWP TYPE IN WIRELESS COMMUNICATION SYSTEM

(71) Applicant: Samsung Electronics Co., Ltd., Suwon-si (KR)

(72) Inventors: Jaehyuk Jang, Suwon-si (KR); Soenghun Kim, Suwon-si (KR); Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 17/792,058

(22) PCT Filed: Jan. 8, 2021

(86) PCT No.: PCT/KR2021/000250
§ 371 (c)(1),
(2) Date: Jul. 11, 2022

(87) PCT Pub. No.: WO2021/145609
PCT Pub. Date: Jul. 22, 2021

(65) Prior Publication Data
US 2023/0063187 A1    Mar. 2, 2023

(30) Foreign Application Priority Data
Jan. 17, 2020 (KR) .................. 10-2020-0006540

(51) Int. Cl.
*H04W 76/27* (2018.01)
*H04L 5/00* (2006.01)

(52) U.S. Cl.
CPC ........... *H04W 76/27* (2018.02); *H04L 5/0098* (2013.01)

(58) Field of Classification Search
CPC ..... H04L 5/001; H04L 5/0098; H04L 5/0048; H04L 5/0057; H04L 27/2607;
(Continued)

(56) References Cited

U.S. PATENT DOCUMENTS 10,015,725 B2    7/2018    Lee et al.
10,455,635 B2   10/2019    Park et al.
(Continued)

FOREIGN PATENT DOCUMENTS

CN    106538012 A    3/2017
CN    107211296 A    9/2017
(Continued)

OTHER PUBLICATIONS

Extended European Search Report dated Dec. 21, 2022, issued in European Patent Application No. 21741320.2.
(Continued)

*Primary Examiner* — Mahran Y Abu Roumi
(74) *Attorney, Agent, or Firm* — Jefferson IP Law, LLP

(57) ABSTRACT

The present disclosure provides a method, performed by a terminal, of controlling activation of a secondary cell (SCell), the method including: receiving a radio resource control (RRC) message including information about a first timer for deactivation of a SCell and information about a second timer for deactivation of a bandwidth part (BWP) of the SCell; receiving a media access control (MAC) control element (CE) for changing a state of the SCell; and controlling the first timer and the second timer based on the MAC CE and the RRC message.

15 Claims, 8 Drawing Sheets

(58) Field of Classification Search
CPC . H04W 76/38; H04W 72/23; H04W 74/0841; H04W 72/0453

See application file for complete search history.

(56) References Cited

U.S. PATENT DOCUMENTS

| | | | |
|---|---|---|---|
| 2019/0132109 A1* | 5/2019 | Zhou | H04L 5/001 |
| 2019/0306890 A1* | 10/2019 | Jang | H04L 5/0098 |
| 2019/0363861 A1* | 11/2019 | Qiu | H04W 16/32 |
| 2021/0235538 A1 | 7/2021 | Hong | |

FOREIGN PATENT DOCUMENTS

| | | |
|---|---|---|
| CN | 109963296 A | 7/2019 |
| KR | 10-2019-0143314 A | 12/2019 |
| WO | 2019/084570 A1 | 5/2019 |

OTHER PUBLICATIONS

CATT, 'Editorial correction for SCell activation and deactivation delay', R4-1916193, 3GPP TSG-RAN4 Meeting #93, Reno, USA, Nov. 29, 2019.

Ericsson, 'Summary#4 of efficient and low latency serving cell configuration/activation/setup', R1-1913549, 3GPP TSG-RAN WG1 #99, Reno, NV, USA, Nov. 25, 2019.

Qualcomm Incorporated et al., 'Discussion on fast SCell activation based on RAN1/RAN4 reply LS', R2-1912195, 3GPP TSG RAN WG2 Meeting #107b, Chongqing, China, Oct. 4, 2019.

International Search Report dated Apr. 15, 2021, issued in International Patent Application No. PCT/KR2021/000250.

Qualcomm Incorporated, Fast SCell Activation and SCell Dormancy, 3GPP TSG-RAN WG1 #98bis, R1-1911139, Oct. 14, 2019, Chongqing, China.

Chinese Office Action dated Sep. 13, 2024, issued in Chinese Patent Application No. 202180007654.5.

European Office Action dated May 15, 2025, issued in a European Patent Application No. 21741320.2.

Samsung; Basic procedure for BWP switching; 3GPP TSG-RAN WG2 Meeting #101; R2-1802436; Athens, Greece; Feb. 26-Mar. 2, 2018.

Samsung Elecronics; Corrections for Handling BWP Inactivity Timer; 3GPP TSG-RAN2 101bis; R2-1804316; Sanya, China; Apr. 16-20, 2018.

Oppo; UE adaptation on BWP/SCell operation; 3GPP TSG-RAN WG2 Meeting #106; R2-1905605; Reno, USA; May 13-17, 2019.

Oppo; Introduction of dormant BWP operation; 3GPP TSG-RAN WG2 Meeting #109 electronic; R2-2002223; revision of R2-2000320; Feb. 24-Mar. 6, 2020.

Chinese Notice of Allowance with English translation dated Jul. 7, 2025; Chinese Appln. No. 202180007654.5.

* cited by examiner

METHOD AND DEVICE FOR DRIVING TIMERS ACCORDING TO BWP TYPE IN WIRELESS COMMUNICATION SYSTEM

TECHNICAL FIELD

The present disclosure relates to a method for performing an operation differently according to a type of a bandwidth part (BWP) when using a carrier aggregation (CA) technology in a wireless communication system, more particularly, in 3rd Generation Partnership Project (3GPP) 5th-generation New Radio (5G NR) technology.

BACKGROUND ART

Efforts have been made to develop an improved 5th generation (5G) communication system or pre-5G communication system to keep up with growing wireless data traffic demand after the commercialization of 4th generation (4G) communication systems. For this reason, the 5G or pre-5G communication system is called a beyond 4G network communication system or a post long-term evolution (LTE) system. Implementation of 5G communication systems in an ultra-high frequency (millimeter-wave (mmWave)) band (such as a 60-GHz band) is under consideration to achieve high data transfer rates. To mitigate path loss of radio waves and increase transmission distance of radio waves in an ultra-high frequency band for 5G communication systems, various technologies such as beamforming, massive multiple-input multiple-output (massive MIMO), full dimensional MIMO (FD-MIMO), array antennas, analog beamforming, and large-scale antennas are being studied and applied to NR systems. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and received-interference cancellation are currently being developed. In addition, for 5G systems, advanced coding modulation (ACM) schemes such as Hybrid FSK and QAM Modulation (FQAM) and Sliding Window Superposition Coding (SWSC) and advanced access techniques such as Filter Bank Multicarrier (FBMC), non-orthogonal multiple access (NOMA), sparse code multiple access (SCMA), etc. are being developed.

Moreover, the Internet has evolved from a human-centered connection network, in which humans create and consume information, to the Internet of things (IoT) network in which dispersed components such as objects exchange information with one another to process the information. Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, health care, smart home appliances, advanced medical services, etc., through convergence and integration between existing information technology (IT) and various industries.

Thus, various attempts are being made to apply a 5G communication system to the IoT network. For example, technologies such as sensor networks, M2M communication, MTC, etc., are implemented using 5G communication techniques such as beamforming, MIMO, array antennas, etc. The application of a cloud RAN as the above-described big data processing technology may be an example of convergence between the 5G and IoT technologies.

In particular, with advancements in a wireless communication system, a method of efficiently using a secondary cell (SCell) is required.

DESCRIPTION OF EMBODIMENTS

Technical Problem

The present disclosure relates to a method for preventing an unnecessary cell state transition in a wireless communication system, more particularly, in 3rd Generation Partnership Project (3GPP) 5th-generation New Radio (5G NR) technology.

Solution to Problem

The present disclosure provides a method of efficiently using a secondary cell (SCell) with advancement in a wireless communication system.

Advantageous Effects of Disclosure

The present disclosure provides an apparatus and method for effectively providing a service in a wireless communication system.

BEST MODE

Figure 1A:
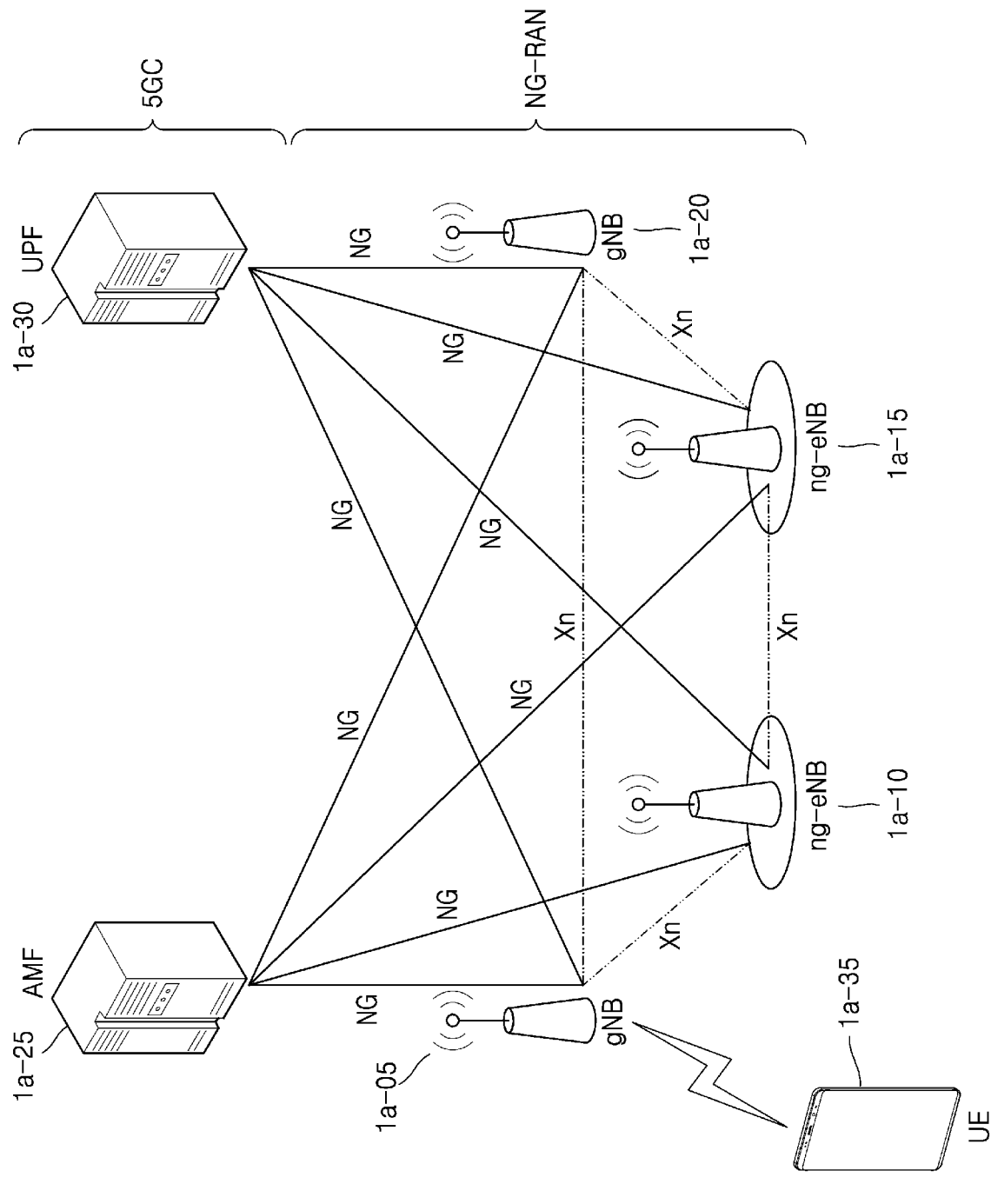
FIG. 1A is a diagram illustrating a structure of a new radio (NR) system according to an embodiment of the present disclosure.

According to an embodiment of the present disclosure, A method, performed by a terminal, of controlling activation of a secondary cell (SCell) includes: receiving a radio resource control (RRC) message including information about a first timer for deactivation of a SCell and information about a second timer for deactivation of a bandwidth part (BWP) of the SCell; receiving a media access control (MAC) control element (CE) for changing a state of the SCell; and controlling the first timer and the second timer based on the MAC CE and the RRC message.

The RRC message may include at least one of state information of the SCell and configuration information of the BWP of the SCell.

The RRC message may include information indicating a default BWP or an initial BWP of the SCell and information indicating a first active BWP that is activated for the first time.

One of BWPs of the Scell may include a dormant BWP.

The first timer may be sCellDeactivationTimer, the second timer may be bwp-InactivityTimer, and the method may include performing an operation for transitioning the SCell to a deactivation state due to expiry of the first timer and performing an operation for switching an active BWP of the SCell to the default BWP or the initial BWP due to expiry of the second timer.

The first timer may expire when data transmission and reception is not performed for a certain time period via the SCell that is in an activation state, and in a case that an active BWP is not the default BWP, the second timer may expire when data transmission and reception is not performed on the active BWP.

The controlling of the first timer and the second timer based on the MAC CE and the RRC message may include starting the first timer when the SCell is activated and the first active BWP is not a dormant BWP and causing the second timer not to run when the first active BWP is the dormant BWP.

According to another embodiment of the present disclosure, a method, performed by a base station, of controlling activation of a SCell includes: transmitting an RRC message including information about a first timer for deactivation of a SCell and information about a second timer for deactivation of a BWP of the SCell; transmitting a MAC CE for changing a state of the SCell; and transitioning the SCell to a deactivation state due to expiry of the first timer and switching an active BWP of the SCell to a default BWP or an initial BWP due to expiry of the second timer.

The RRC message may include state information of the SCell, configuration information of the BWP of the SCell, information indicating the default BWP or the initial BWP of the SCell, and information indicating a first active BWP that is activated for the first time.

One BWP of the SCell may include a dormant BWP.

When the first active BWP of the SCell is not the dormant BWP, the first timer may be started, and when the first active BWP of the SCell is the dormant BWP, the second timer may not be started.

According to another embodiment of the present disclosure, a terminal for controlling activation of a SCell includes: a transceiver; and a processor combined with the transceiver and configured to receive an RRC message including information about a first timer for deactivation of a SCell and information about a second timer for deactivation of a BWP of the SCell, receive a MAC CE for changing a state of the SCell, and control the first timer and the second timer based on the MAC CE and the RRC message.

The RRC message may include state information of the SCell, configuration information of the BWP of the SCell, information indicating the default BWP or the initial BWP of the SCell, and information indicating a first active BWP that is activated for the first time, and one BWP of the SCell may include a dormant BWP.

The first timer may be sCellDeactivationTimer, the second timer may be bwp-InactivityTimer, and the processor may be further configured to perform an operation for transitioning the SCell to a deactivation state due to expiry of the first timer and perform an operation for switching an active BWP of the SCell to the default BWP or the initial BWP due to expiry of the second timer.

The processor may be further configured to start the first timer when the SCell is activated and the first active BWP is not the dormant BWP and not start the second timer when the first active BWP is the dormant BWP.

According to another embodiment of the present disclosure, a base station for controlling activation of a SCell includes: a transceiver; and a processor combined with the transceiver and configured to transmit an RRC message including information about a first timer for deactivation of a SCell and information about a second timer for deactivation of a BWP of the SCell and transmit a MAC CE for changing a state of the SCell, wherein the SCell transitions to a deactivation state due to expiry of the first timer, and an active BWP of the SCell switches to a default BWP or an initial BWP due to expiry of the second timer.

MODE OF DISCLOSURE

Hereinafter, operation principles of the present disclosure will be described in detail with reference to the accompanying drawings. In the following description of the present disclosure, when it is determined that detailed descriptions of related known functions or configurations may unnecessarily obscure the subject matter of the present disclosure, the descriptions thereof will be omitted. Furthermore, the terms to be described later are defined by taking functions described in the present disclosure into account and may be changed according to a user's or operator's intent or customs. Therefore, definition of the terms should be made based on the overall descriptions in the present specification.

As used in the following description, terms identifying access nodes, terms indicating network entities, terms indicating messages, terms indicating interfaces between network entities, terms indicating various types of identification information, etc. are exemplified for convenience of description. Accordingly, the present disclosure is not limited to terms to be described later, and other terms representing objects having the equivalent technical meaning may be used.

Advantages and features of the present disclosure and methods of accomplishing the same will be more readily appreciated by referring to the following description of embodiments and the accompanying drawings. However, the present disclosure may be embodied in many different forms and should not be construed as being limited to the disclosed embodiments set forth herein; rather, the embodiments are provided so that the present disclosure will be thorough and complete and will fully convey the concept of the disclosure to those of ordinary skill in the art, and the present disclosure will only be defined by the appended claims. Throughout the specification, like reference numerals refer to like elements.

It will be understood that each block of the flowchart in the drawings and combinations of blocks of the flowchart may be performed by computer program instructions. These computer program instructions may be loaded into a processor of a general-purpose computer, special-purpose computer, or other programmable data processing equipment, and thus, the instructions performed via the processor of the computer or other programmable data processing equipment create a means for performing functions specified in the flowchart block(s). The computer program instructions may also be stored in a computer-executable or computer-readable memory capable of directing a computer or another programmable data processing apparatus to implement functions in a specific manner, and thus, the instructions stored in the computer-executable or computer-readable memory may produce an article of manufacture including the instruction means for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be configured so as to be in an addressable storage medium, or may be configured so as to operate one or more processors. Thus, according to an embodiment, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. In addition, according to some embodiments, the "unit" may include one or more processors.

In the following descriptions of the disclosure, related known functions or configurations are not described in detail when it is deemed that they would unnecessarily obscure the essence of the present disclosure. Hereinafter, embodiments of the present disclosure will be described in detail with reference to the accompanying drawings.

As used in the following description, terms identifying access nodes, terms indicating network entities, terms indicating messages, terms indicating interfaces between network entities, terms indicating various types of identification information, etc. are exemplified for convenience of descriptions. Accordingly, the present disclosure is not limited to terms to be described later, and other terms representing objects having the equivalent technical meaning may be used. For example, in the following descriptions, a terminal may refer to medium access control (MAC) entities in the terminal, which respectively exist for a master cell group (MCG) and a secondary cell group (SCG) as described below.

Hereinafter, for convenience of descriptions, the present disclosure uses terms and names defined in the 3rd Generation Partnership Project Long-Term Evolution (3GPP LTE) standard. However, the present disclosure is not limited to the terms and names but may also be identically applied to systems that comply with other standards.

Hereinafter, a base station (BS) is an entity that allocates resources to a terminal, and may be at least one of a next-generation Node B (gNB), an evolved Node B (eNB), a Node B, a BS, a wireless access unit, a BS controller, or a network node. A terminal may include a user equipment (UE), a mobile station (MS), a cellular phone, a smart phone, a computer, or a multimedia system capable of performing a communication function. However, the terminal is not limited to the above examples.

In particular, the present disclosure may be applied to the 3GPP New Radio (NR) standard (the 5th generation (5G) mobile communications standard). Furthermore, the present disclosure may be applied to intelligent services (e.g., smart homes, smart buildings, smart cities, smart cars or connected cars, health care, digital education, retail businesses, security and safety related services, etc.) based on the 5G communication technology and Internet of Things (IoT) related technology. In the present disclosure, eNB may be used interchangeably with gNB for convenience of descriptions. In other words, a BS described as eNB may represent a gNB. Furthermore, the term 'terminal' may refer to a mobile phone, narrowband IoT (NB-IoT) devices, sensors, and other wireless communication devices.

Wireless communication systems have progressed beyond providing initial voice-centered services into broadband wireless communication systems that provide high-speed, high-quality packet data services based on communication standards such as 3GPP's High Speed Packet Access (HSPA), LTE or Evolved Universal Terrestrial Radio Access (E-UTRA), and LTE-Advanced (LTE-A), 3GPP2's High Rate Packet Data (HRPD), Ultra Mobile Broadband (UMB), and IEEE's 802.16e.

As a representative example of a broadband wireless communication system, an LTE system adopts an orthogonal frequency division multiplexing (OFDM) scheme for downlink (DL) and a single carrier frequency division multiple access (SC-FDMA) scheme for uplink (UL). UL refers to a radio link through which a terminal (UE or MS) transmits data or a control signal to a BS (or eNB), and DL refers to a radio link through which the BS transmits data or a control signal to the terminal. In the multiple access schemes as described above, data or control information of each user may be identified by allocating and operating time-frequency resources carrying the data or the control information for each user to prevent overlapping i.e., obtain orthogonality between the time-frequency resources.

Because a post-LTE communication system, i.e., a 5G communication system, needs to be able to freely reflect various requirements from users and service providers, the 5G communication system is required to support services that simultaneously satisfy the various requirements. Services being considered for 5G communication systems include Enhanced Mobile BroadBand (eMBB), Massive Machine Type Communication (mMTC), Ultra-Reliable Low-Latency Communication (URLLC), etc.

According to some embodiments, eMBB may aim to provide higher data transfer rates than those supported by the existing LTE, LTE-A, or LTE-Pro. For example, in 5G communication systems, eMBB should be able to deliver peak data rates of 20 gigabits per second (Gbps) in DL and 10 Gbps in UL from a BS perspective. Furthermore, the 5G communication systems should be able to provide better user perceived data rates while simultaneously delivering the peak data rates. To meet such requirements, the 5G communication systems may require improvement of various transmission and reception technologies including a further improved multi-input multi-output (MIMO) transmission technology. Furthermore, while a current LTE system transmits signals by using a maximum transmission bandwidth of 20 megahertz (MHz) in the 2 GHz band, a 5G communication system may satisfy data transfer rates required by a 5G technology by using a wider frequency bandwidth than 20 MHz in the 3 GHz to 6 GHz bands or the bands above 6 GHz.

At the same time, mMTC is being considered to support application services such as the IoT in 5G communication systems. In order to efficiently provide the IoT, the mMTC may require support of massive connections with terminals in a cell, enhanced terminal coverage, improved battery life, low terminal cost, etc. Because the IoT is a system equipped with multiple sensors and various devices to provide communication functions, it must be able to support a large number of terminals (e.g., one million terminals per square kilometer ($km^2$)) in a cell. Furthermore, because a terminal supporting the mMTC is highly likely to be located in a shaded area that cannot be covered by a cell, such as a basement of a building, due to characteristics of the service, the mMTC may require wide area coverage compared to other services provided by a 5G communication system. The terminal supporting the mMTC should be configured as a low-cost terminal and require a very long battery lifetime such as 10 to 15 years because it is difficult to frequently replace a battery of the terminal.

Lastly, URLLC is a cellular-based wireless communication service used for mission-critical applications such as remote control of robots or machinery, industrial automation, unmanned aerial vehicles (UAVs), remote health care, emergency alert services, etc. Thus, URLLC communications should be able to provide very low latency (ultra-low latency) and very high reliability (ultra-high reliability). For example, services supporting URLLC may have to satisfy air interface latency of less than 0.5 milliseconds (ms) and simultaneously have requirements of packet error rate of equal to or less than $10^{-5}$. Thus, for the services supporting URLLC, a 5G system has to provide a transmission time interval (TTI) shorter than for other services and may simultaneously require a design for allocating wide frequency-band resources to ensure high reliability of a communication link.

The above-described three services considered in the 5G communication systems, i.e., eMBB, URLLC, and mMTC, may be multiplexed in one system for transmission. In this regard, different transmission and reception techniques and transmission and reception parameters may be used between services to satisfy different requirements for the respective services. However, the mMTC, URLLC, and eMBB are merely examples of different service types, and service types to which the present disclosure is applied are not limited to the above-described examples.

Hereinafter, for convenience of descriptions, the present disclosure uses terms and names defined in LTE and NR standards, which are latest standards defined by the 3GPP organization among existing communication standards. However, the present disclosure is not limited by the terms and names but may also be equally applied to systems that comply with other standards. In particular, the present disclosure may be applied to the 3GPP NR standard (the 5G mobile communications standard). Furthermore, the embodiments of the present disclosure may be applied to other communication systems having similar technical backgrounds and channel configurations. It should be also understood by those skilled in the art that embodiments of the present disclosure are applicable to other communication systems through modifications not departing from the scope of the present disclosure.

Hereinafter, the present disclosure provides a method for preventing an unnecessary cell state transition in a case that a bandwidth part (BWP) on which a secondary cell (SCell) operates is a dormant BWP when using a carrier aggregation (CA) technology in a wireless communication system, and more particularly, in a 3GPP 5G NR technology.

In addition, in the present disclosure below, a method for performing operations differently according to a type of a BWP when using a CA technology is described.

Through an embodiment of the present disclosure, a terminal may maintain an unused SCell in a standby state so that the Scell may be used immediately when needed, thereby reducing a delay.

FIG. 1A is a diagram illustrating an architecture of an NR system according to an embodiment of the present disclosure. Referring to FIG. 1A, a wireless communication system may include a plurality of BSs 1a-05, 1a-10, 1a-15, and 1a-20, an access and mobility management function (AMF) 1a-26, and a user plane function (UPF) 1a-30. A UE (hereinafter referred to as a UE or terminal) 1a-35 may connect to an external network through the BSs 1a-05, 1a-10, 1a-15, and 1a-20, and the UPF 1a-30. However, the wireless communication system is not limited to the example of FIG. 1A, and may include more or fewer components than those illustrated in FIG. 1A.

The BSs 1a-05, 1a-10, 1a-15, and 1a-20, which are access nodes in a cellular network, may provide wireless connectivity to UEs accessing the network. In other words, in order to serve users' traffic, the BSs 1a-05, 1a-10, 1a-15, and 1a-20 may schedule UEs by collecting status information such as the UE's buffer states, available transmission power states, and channel states and thus support connectivity between each UE and a core network (CN; in particular, an NR CN is referred to as a 5GC). Moreover, a communication system including an NR system may be configured to handle traffic by splitting it into a user plane (UP) related to actual user data transmission and a control plane (CP) such as connection management, etc., and the gNBs 1a-05 and 1a-20 in FIG. 1A may use UP and CP related techniques defined in an NR technology, while the ng-eNBs 1a-10 and 1a-15 may be connected to a 5GC but use UP and CP related techniques defined in an LTE technology.

The AMF (or session management function (SMF)) 1a-25 may be connected to a plurality of BSs as an entity responsible for various control functions including a mobility management function for a UE, and the UPF 1a-30 is a kind of gateway device that provides data transmission.

Figure 1B:
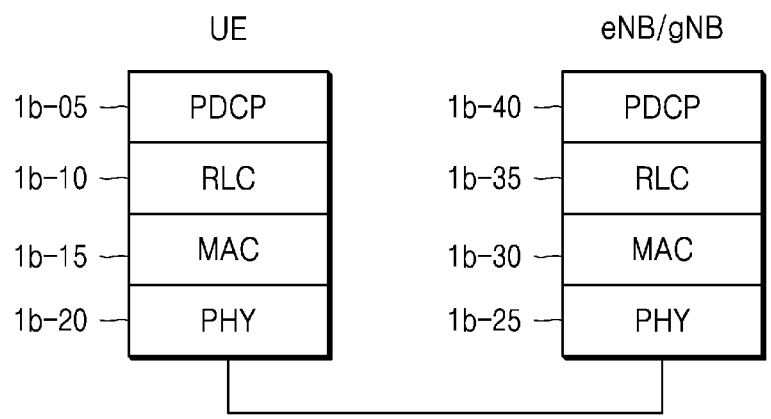
FIG. 1B is a diagram illustrating radio protocol architectures for long-term evolution (LTE) and NR systems according to an embodiment of the present disclosure.

FIG. 1B is a diagram illustrating radio protocol architectures for long-term evolution (LTE) and NR systems according to an embodiment of the present disclosure.

Referring to FIG. 1B, a radio protocol stack for each of a UE and an eNB in an LTE system may include a packet data convergence protocol (PDCP) layer (or entity) 1b-05 or 1b-40, a radio link control (RLC) layer (or entity) 1b-10 or 1b-35, and a medium access control (MAC) layer (entity) 1b-15 or 1b-30.

The PDCP layer 1b-05 or 1b-40 may be responsible for performing compression/decompression of an IP header, and the RLC layer 1b-10 or 1b-35 may reconfigure PDCP packet data units (PDUs) to appropriate sizes.

The MAC layer 1b-15 or 1b-30 may be connected with multiple RLC layer entities configured for a UE and multiplex RLC PDUs into MAC PDUs and demultiplex RLC PDUs from MAC PDUs.

A physical (PHY) layer 1b-20 or 1b-25 may perform channel coding and modulation on upper-layer data to generate orthogonal frequency division multiplexing (OFDM) symbols and transmit the OFDM symbols via a radio channel, or perform demodulation and channel decoding on OFDM symbols received via a radio channel and transfer the demodulated and channel-decoded OFDM symbols to an upper layer. Furthermore, hybrid automatic repeat request (HARQ) is used for additional error correction at the PHY layer, and a receiving end may transmit 1 bit of information indicating whether packets transmitted from a transmitting end are received. The information is referred to as HARQ acknowledgement (ACK)/negative acknowledgement (NACK) information.

DL HARQ ACK/NACK information for UL data transmission may be transmitted via a physical HARQ indicator channel (PHICH) in LTE, and in NR, it may be provided based on scheduling information of a corresponding UE in a physical DL control channel (PDCCH) which is a channel on which DL/UL resource allocation or the like is transmitted. In other words, in NR, a BS or UE may determine, via the PDCCH, whether retransmission of UL data is required and whether to perform new transmission. This is because asynchronous HARQ is used in NR. UL HARQ ACK/NACK information for DL data transmission may be transmitted through a physical UL control channel (PUCCH) or a physical UL shared channel (PUSCH). In general, a PUCCH is transmitted in the UL in a primary cell (PCell), as described later, but, a BS may additionally transmit the PUCCH to the UE in a SCell when it is supported by a UE, as described later, and the SCell is called a PUCCH SCell.

Although not shown in FIG. 1B, a radio resource control (RRC) layer may exist as a higher layer of the PDCP layer at each of the UE and the BS, and exchange connection and measurement configuration control messages for controlling radio resources.

Moreover, the PHY layer may be configured to use one or more frequencies/carriers, and a technology for simultaneously configuring and using a plurality of frequencies is referred to as CA. A CA technology may significantly increase a transmission capacity by the number of secondary carriers by using a primary carrier and one or a plurality of secondary carriers instead of only one carrier for communication between a UE and a BS (e.g., an eNB in LTE or a gNB in NR). In LTE, a cell in a BS using a primary carrier is termed a PCell, and a cell using a secondary carrier is termed a SCell. A technology that extends CA functionality to two BSs is referred to as dual connectivity (DC). In the DC technology, a UE may be simultaneously connected to and use a master BS (a Master Evolved Universal Terrestrial Radio Access Network (E-UTRAN) NodeB (MeNB)) and a secondary BS (a secondary E-UTRAN nodeB (SeNB)), and cells belonging to the master BS are called a MCG, and cells belonging to the secondary BS are called a SCG. There is a representative cell for each cell group, and a representative cell of the MSG is called a PCell, and a representative cell of the SCG is called a primary secondary cell (PSCell). When using the above-described NR, the MCG may use an LTE technology while the SCG may use the NR, so that a UE may use the LTE and NR simultaneously. In NR, each cell group (i.e., the MSG or SCG) may have a maximum of 16 serving cells (a PCell and SCells in a MCG or a PSCell and SCells in a SCG).

Figure 1C:
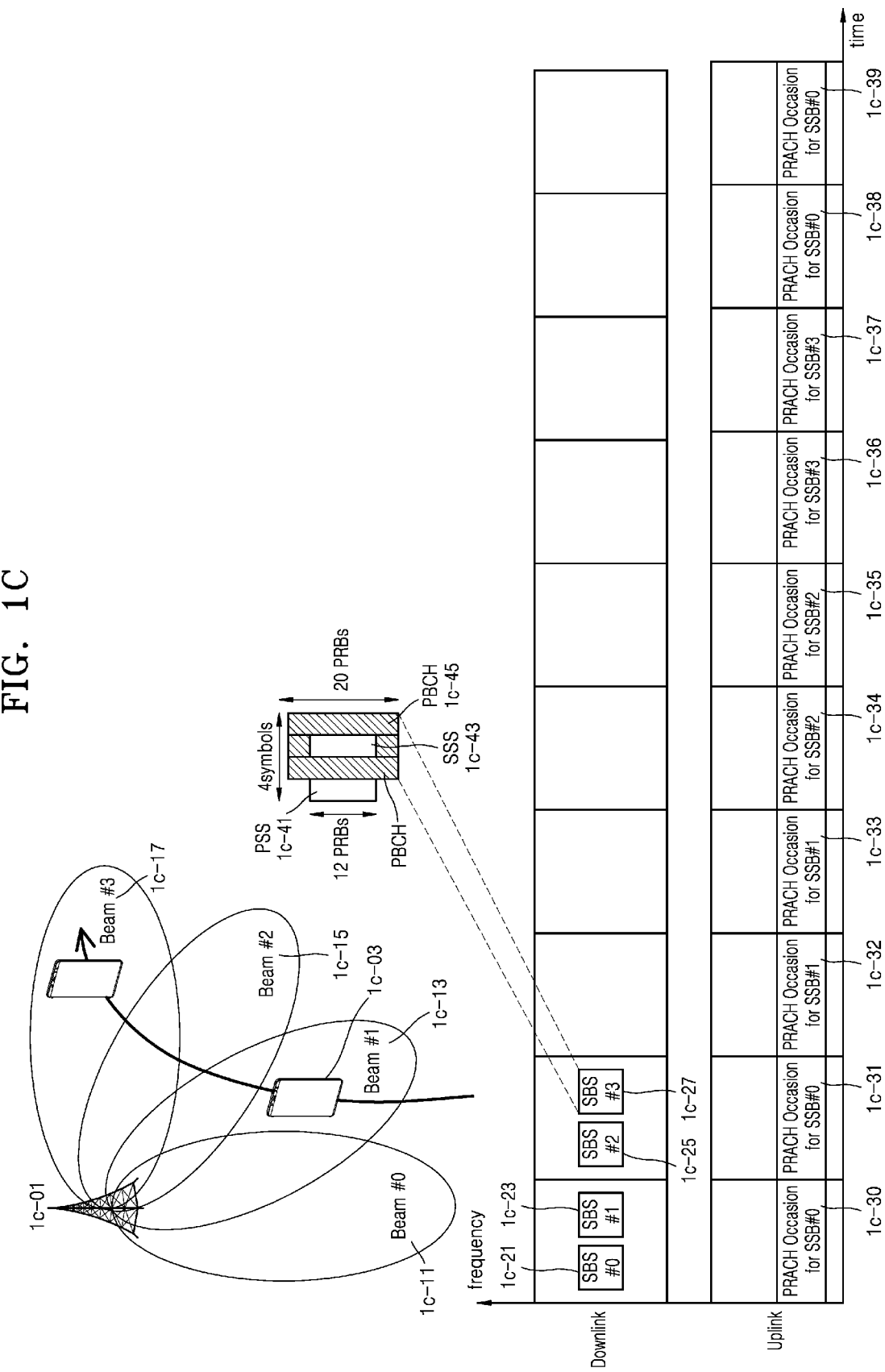
FIG. 1C is a diagram illustrating structures of downlink and uplink channel frame structures when a beam-based communication is performed on an NR system, according to an embodiment of the present disclosure.

FIG. 1C is a diagram illustrating structures of DL and UL channel frames when an NR system performs beam-based communications, according to an embodiment of the present disclosure.

Referring to FIG. 1C, a BS 1c-01 may transmit signals in the form of beams 1c-11, 1c-13, 1c-15, and 1c-17 for a wider coverage or transmission of a stronger signal. Accordingly, a UE 1c-03 in a cell may have to transmit or receive data using a specific beam (beam #1 1c-13 in FIG. 1C) transmitted by the BS.

Moreover, states of the UE are divided into an idle mode (RRC_IDLE) state and a connected mode (RRC_CONNECTED) state depending on whether the UE is connected to the BS. Accordingly, the BS may not identify a location of the UE in the RRC_IDLE state.

When the UE in the RRC_IDLE state attempts to transition to the RRC_CONNECTED state, the UE may receive synchronization signal blocks (SSBs) 1c-21, 1c-23, 1c-25, and 1c-27 transmitted by the BS. The SSBs are SSB signals periodically transmitted according to a period set by the BS, and each of the SSBs may include a primary synchronization signal (PSS) 1c-41, a secondary synchronization signal (SSS) 1c-43, and a physical broadcast channel (PBCH).

In FIG. 1C, a scenario in which an SSB is transmitted for each beam is assumed. As an example, a case where SSB #0 1c-21 is transmitted by using beam #0 1c-11, SSB #1 1c-23 is transmitted by using beam #1 1c-13, SSB #2 1c-25 is transmitted by using beam #2 1c-15, and SSB #3 1c-27 is transmitted by using beam #3 1c-17 is assumed. Furthermore, although it is assumed in FIG. 1C that the UE in the RRC_IDLE state is located in beam #1, even when the UE in the RRC_CONNECTED state performs random access, the UE selects an SSB received at a time point when it performs the random access.

Referring to FIG. 1C, the UE may receive SSB #1 transmitted by using beam #1. Upon receiving SSB #1, the UE may obtain a physical cell identifier (PCI) of the BS through the PSS and the SSS, and by receiving the PBCH, the UE may determine an identifier (i.e., #1) of a currently received SSB and which position in a 10 ms frame is a position where the current SSB is received as well as which system frame number (SFN) in SFN ranges having a periodicity of 10.24 seconds corresponds to the position where the current SSB is received. In addition, a master information block (MIB) may be included in the PBCH, and include information about where system information block type 1 (SIB1) for broadcasting more detailed cell configuration information is to be received. Upon receiving SIB1, the UE may recognize a total number of SSBs transmitted by the BS, and identify a location of a physical random access channel (PRACH) occasion (in FIG. 1C, a scenario in which a PRACH occasion is allocated every 1 ms is assumed: PRACH occasions 1c-30 through 1c-39) on which the UE may perform random access to transition to the RRC_CONNECTED state (more precisely, on which the UE is allowed to transmit a preamble that is a physical signal specially designed to achieve UL synchronization).

In addition, the UE may determine which PRACH occasion among the PRACH occasions is mapped to an SSB index based on information of SIB1. For example, in FIG. 1C, a scenario in which a PRACH occasion is allocated every 1 ms is assumed, and a scenario in which a ½ SSB is allocated per PRACH occasion (i.e., two PRACH occasions per SSB) is assumed. Accordingly, a scenario in which two PRACH occasions are allocated for each SSB from the start of the PRACH occasion which starts according to an SFN value is illustrated. In other words, the PRACH occasions 1c-30 and 1c-31 may be allocated for SSB #0, and the PRACH occasions 1c-32 and 1c-33 may be allocated for SSB #1. After PRACH occasions are configured for all SSBs, a PRACH occasion may be allocated again for the first SSB (PRACH occasions 1c-38 and 1c-39).

Accordingly, the UE recognizes locations of PRACH occasions 1c-32 and 1c-33 for SSB #1, and thus, transmits a random access preamble on an earliest PRACH occasion (e.g., PRACH occasion 1c-32) at a current time point among the PRACH occasions 1c-32 and 1c-33 corresponding to SSB #1. Because the BS has received the preamble on the PRACH occasion 1c-32, the BS may know that the UE has transmitted the preamble by selecting SSB #1, and data may be transmitted and received through a beam corresponding to SSB #1 when subsequent random access is performed.

Figure 1D:
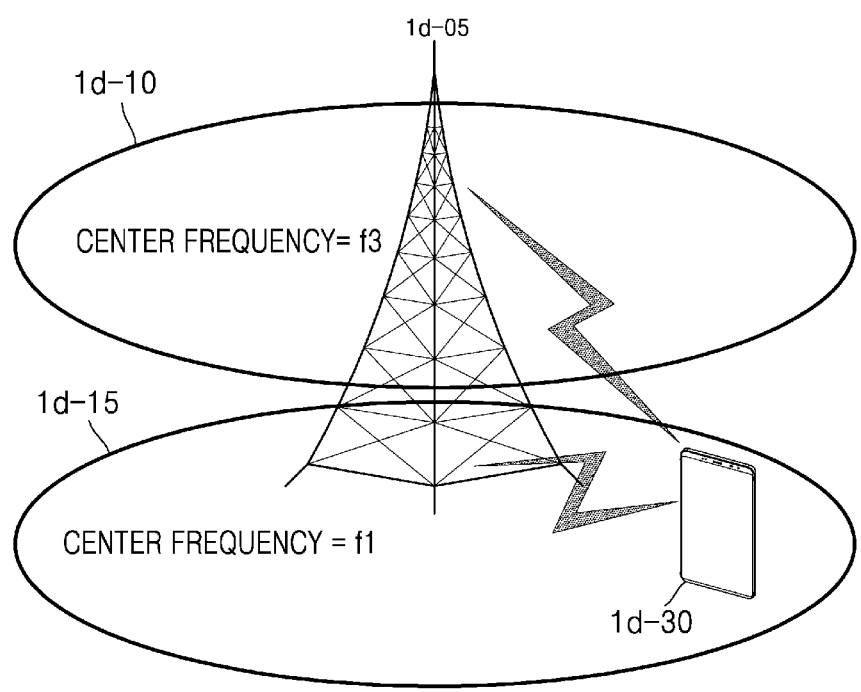
FIG. 1D is a diagram for explaining a carrier aggregation (CA) technology according to an embodiment of the present disclosure.

FIG. 1D is a diagram for explaining a CA technology according to an embodiment of the present disclosure.

Referring to FIG. 1D, in general, one BS may transmit and receive multiple carriers over several frequency bands. For example, when a BS 1d-05 transmits a carrier 1d-15 having a center frequency f1 and a carrier 1d-10 having a center frequency f3, according to a related art, a UE transmits and receives data using one of the two carriers. However, a UE having a CA capability may simultaneously transmit and receive data on multiple carriers. The BS 1d-05 may allocate, depending on the situation, more carriers to a UE 1d-30 having a CA capability, thereby increasing a transmission rate of the UE 1d-30.

In a traditional sense, when one forward carrier and one reverse carrier transmitted and received from a BS form a cell, CA may be understood as a UE simultaneously transmitting and receiving data via multiple cells. Through this, a maximum transmission rate increases in proportion to the number of aggregated carriers.

In the following description of the present disclosure, when a UE receives data on a forward carrier or transmits data on a reverse carrier, it has the same meaning as transmitting or receiving data by using a control channel and a data channel provided by a cell corresponding to a center frequency and a frequency band that characterize a carrier. In addition, although an embodiment of the present disclosure will be described based on LTE and NR systems for convenience of descriptions, the present disclosure may be applied to various wireless communication systems supporting CA.

Even when CA is performed or not performed, reverse transmission power must be maintained at an appropriate level because reverse transmission by another cell, ((i.e., transmission from a UE to a BS) causes interference in reverse transmission by another cell. For this purpose, when the UE performs reverse transmission, the UE may calculate a reverse transmission power by using a certain function and perform reverse transmission based on the calculated reverse transmission power. For example, the UE may calculate a required reverse transmission power value by inputting, to the certain function, input values that may be used to estimate a channel state, such as scheduling information including the amount of an allocated transmission resource, a modulation coding scheme (MCS) level to be applied, etc., a path loss value, etc., and perform reverse transmission by applying the calculated required reverse transmission power value. The reverse transmission power applicable to the UE is limited by a maximum transmission value of the UE, and when the calculated required transmission power value exceeds a maximum transmission value of the UE, the UE may perform reverse transmission by applying the maximum transmission value. In this case, because a sufficient reverse transmission power is not applied, a quality of the reverse transmission may deteriorate. It may be desirable for the BS to perform scheduling so that the required transmission power does not exceed the maximum transmission power. However, because the BS is not capable of measuring some parameters such as a path loss, etc., the UE transmits a power headroom report (PHR) when necessary to report a state of its available transmission power (a power headroom (PH)) to the BS.

Factors affecting the available transmission power include 1) the amount of allocated transmission resources, 2) a MCS to be applied to reverse transmission, 3) a path loss of the associated forward carrier, 4) an accumulated value of power control commands, and the like. The path loss (hereinafter referred to as PL) or the accumulated value of power control commands may differ for each reverse carrier, and thus, when a plurality of reverse carriers are aggregated in one UE, it is desirable to configure whether to transmit a PHR for each of the reverse carriers. However, for efficient transmission of a PHR, PHs for all of the plurality of reverse carriers may be reported on one reverse carrier. Depending on an operation strategy, a PH for a carrier in which actual PUSCH transmission does not occur may be required. Thus, in this case, a method of reporting PHs for a plurality of reverse carriers on one reverse carrier may be more efficient. For this purpose, an existing PHR needs to be extended. A plurality of PHs to be included in one PHR may be configured according to a predetermined order.

A PHR is triggered when a PL of a typically connected forward carrier is changed to be greater than or equal to a certain reference value, when a prohibit PHR timer expires, or when a certain time period elapses after generation of the PHR. Even when the PHR is triggered, the UE does not immediately transmit the PHR but waits until a time point when reverse transmission is allowed, e.g., a time point when a reverse transmission resource is allocated. This is because the PHR is not information that has to be processed very rapidly.

Moreover, as described above, a cell where a UE initially connects by performing random access may be referred to as a PCell, and a cell added to the PCell may be referred to as an SCell. A SCell is added to or released from the UE by using a message from an RRC layer, and when the SCell is added via RRC, the corresponding SCell is in a deactivation state. Thereafter, by receiving a SCell Activation/Deactivation MAC control element (CE) from the BS, a configured cell may be activated (active) or deactivated (inactive).

Moreover, in the NR system, the UE may be configured with up to four BWPs for each configured serving cell (PCell or SCell), and may actually perform an operation on only one configured BWP in each serving cell. At this time, the BWP actually used may be referred to as an active BWP. For example, for SCell 1 having a total bandwidth of 100 MHz, BWP #1 having a bandwidth of 20 MHz and BWP #2 having a bandwidth of 80 MHz may be assumed. In this example, the BS may designate a first active BWP (a BWP activated for the first time) e.g., BWP #1) when configuring each serving cell to thereby configure a BWP in which an operation is performed for the first time when the corresponding SCell is activated. Accordingly, in a case that SCell 1 transitions from a deactivation state to an activation state, an active BWP may be BWP #1.

Furthermore, when a deactivated serving cell is activated, a delay may occur until it is actually activated. Even when the BS activates a serving cell, in order to actually use the serving cell, a delay may occur because the UE measures a channel state of the serving cell (its activated BWP) and reports it to the BS and then the BS needs to determine which MCS is to be used for scheduling through the serving cell. In particular, in the above-described beam-based system, when the UE and the BS communicate using multiple beams, a longer actual delay may be required because a channel state needs to be measured by changing a beam.

For this problem, a method of configuring, while activating a serving cell itself (i.e., a corresponding SCell is in an activation state), a 'dormant BWP' among BWPs configured by the BS in the serving cell and switching an active BWP to the dormant BWP may be considered. For example, in order to configure a dormant BWP for the UE, the BS may not perform PDCCH related configuration in configuration information of a corresponding BWP. Accordingly, when changing to the dormant BWP, the UE performs an operation such as measuring and reporting a signal in the corresponding serving cell but is not allowed to transmit and receive data through a PDCCH. However, when data transmission and reception is required, in another activated serving cell (e.g., a PCell), the BS may transmit a command for changing (or switching) an active BWP to another BWP for a serving cell in which the dormant BWP is the active BWP via a PDCCH. In other words, because data transmission and reception is impossible in the dormant BWP, the BS may transmit, to the UE, a command for switching the active BWP of the corresponding serving cell to a BWP other than the dormant BWP on a PDCCH of another activated serving cell, and accordingly, the UE may transmit and receive data in the corresponding serving cell by switching the active BWP of the corresponding serving cell from the dormant BWP to another BWP.

Figure 1E:
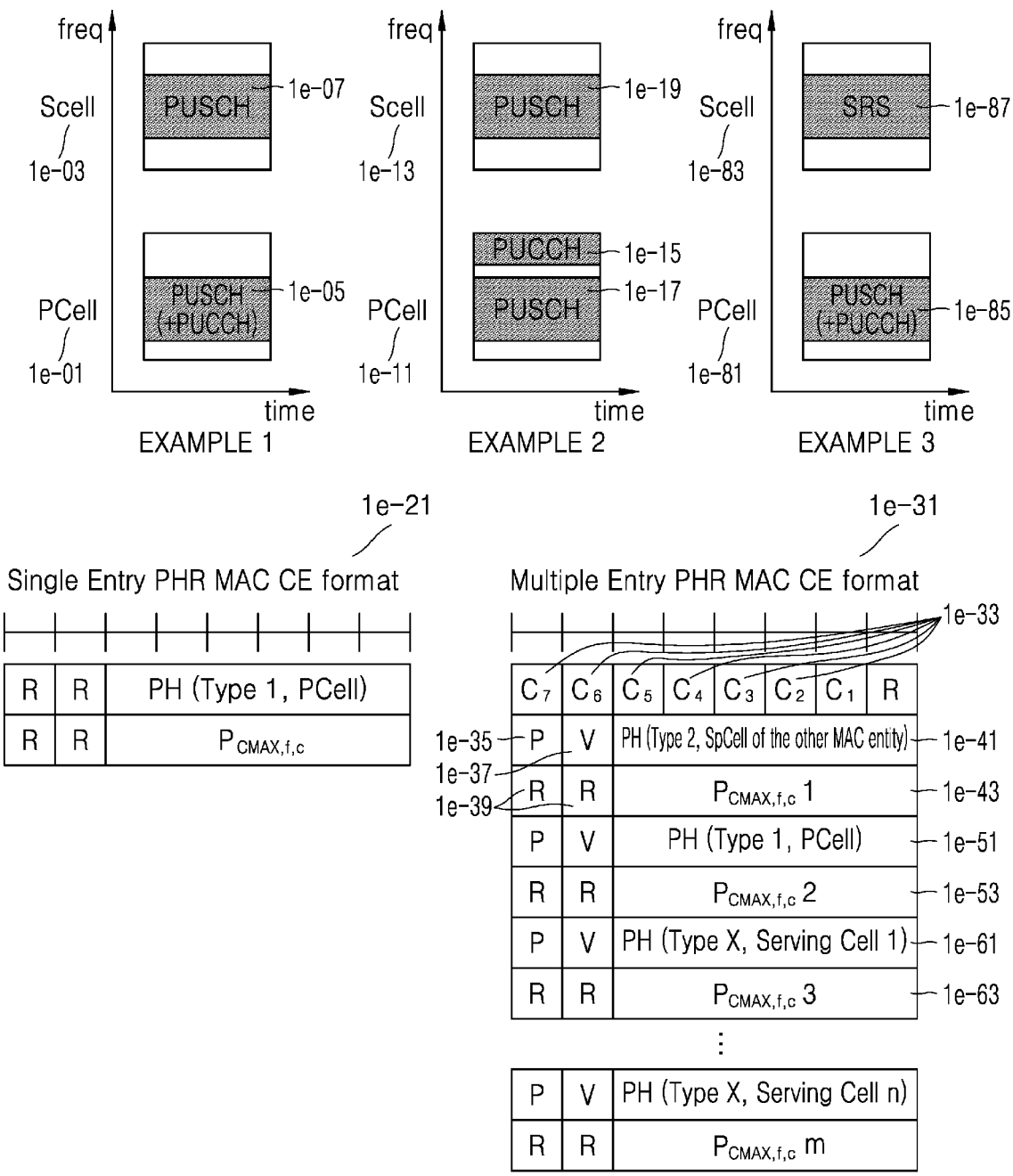
FIG. 1E is a diagram illustrating a concept of uplink remaining power according to an embodiment of the present disclosure.

FIG. 1E is a diagram illustrating a concept of UL remaining power according to an embodiment of the present disclosure.

In FIG. 1E, Example 1 schematically illustrates a scenario in which a UE is configured with two serving cells, i.e., a PCell 1e-01 and a SCell 1e-03, and then performs UL transmission according to scheduling by a BS. In the scenario of Example 1, the UE is not capable of simultaneously transmitting the PUCCH and the PUSCH in one serving cell due to constraints on a transmission method and a radio frequency (RF) structure. Accordingly, the UE may transmit the PUSCH with PUCCH information embedded therein (1e-05). In this case, the PUCCH information may be transmitted on a PCell or, when there is no PUSCH transmitted on the PCell, the PUCCH information may be transmitted on a SCell having a low index among SCells. The above-described PHR message may be transmitted through a part of the PUSCH, and thus, in the scenario of Example 1, the UE only needs to report only a PH value obtained by subtracting a transmission power consumed in PUSCH transmissions 1e-05 and 1e-07 from maximum transmission power $P_{CMAX,c}$ for each serving cell. This may be referred to as Type 1 PH.

Similarly, Example 2 schematically illustrates a scenario in which the UE is configured with two serving cells, i.e., a PCell 1e-11 and a SCell 1e-13, and then performs UL transmission according to scheduling by the BS. In the scenario of Example 2, the UE may have a capability to simultaneously transmit the PUCCH and the PUSCH in one serving cell, or transmit the PUCCH and the PUSCH separately using an UL transmission technology that allows simultaneous transmission. Here, in a PCell 1e-11 (or when a PUCCH can be transmitted on a SCell, the same is applied to a SCell 1e-13), the UE needs to report a PH value, which is obtained by subtracting both a PUSCH transmission power and a PUCCH transmission power from a maximum transmission power $P_{CMAX,f,c}$ of the PCell 1e-11, by taking into account transmission powers consumed by a PUCCH transmission 1e-15 as well as a PUSCH transmission 1e-17. This may be referred to as Type 2 PH.

Example 3 schematically illustrates a scenario in which the UE is configured with two serving cells, i.e., a PCell 1e-81 and a SCell 1e-83, and then performs UL transmission according to scheduling by the BS. In the scenario of Example 3, the UE is not capable of simultaneously transmitting the PUCCH and the PUSCH in one serving cell due to constraints on a transmission method and an RF structure. Accordingly, the UE may transmit the PUSCH with PUCCH information embedded therein (1e-85). In this case, the PUCCH information may be transmitted on a PCell or, when there is no PUSCH transmitted on the PCell, it may be transmitted on a SCell having a low index among SCells. Moreover, in the scenario of Example 3, on the Scell 1e-83, there is no PUSCH transmission, but only a Sounding Reference Signal (SRS) is transmitted. This may occur in a scenario where, when the SCell 1e-83 is a time-division duplexing (TDD) cell, UL data transmission is not performed on the SCell 1e-83, but an SRS is transmitted as a reference signal on the UL for channel estimation for DL data transmission and allow the BS to measure a UL channel and use a measurement result for DL. Accordingly, the UE only has to report only a PH value obtained by subtracting transmission powers consumed in the PUSCH transmission 1e-85 and SRS transmission 1e-87 from maximum transmission power $P_{CMAX,c}$ for each serving cell. Here, a remaining power obtained by subtracting the transmission power for the PUSCH transmission 1e-85 from the maximum transmission power $P_{MCAX,c}$ is called Type 1 PH, and a remaining power obtained by subtracting the transmission power consumed in the SRS transmission 1e-87 from the maximum transmission power $P_{CMAX,c}$ is called Type 3 PH.

When reporting the Type 1 PH, Type 2 PH, or Type 3 PH, the UE may report such a PH by using a MAC CE, which is a control message from a MAC layer, and in more detail, the UE may report a PH by using a single entry PHR MAC CE format 1e-21 or a multiple entry PHR MAC CE format 1e-31. When only a single carrier is used, the UE may use the single entry PHR MAC CE format for reporting, and when DC is configured (or CA is configured), the UE may use the multiple entry PHR MAC CE format for reporting.

When the single entry PHR MAC CE format is used, the UE transmits a PH 1e-23 for a corresponding serving cell and a maximum transmission power $P_{CMAX,f,c}$ 1e-25 of the serving cell. A value of a PH is used to indicate one of ranges from −32 dB to 38 dB, which may indicate an available transmission power of the UE.

The UE calculates the available transmission power by using Equation below or Equation corresponding thereto.

$$PH_{type1,b,f,c}(i,j,q_d)=P_{CMAX,f,c}(i)-\{P_{O\_PUSCHb,f,c}(j)+ 10\log_{10}(2^{\mu}\cdot M_{RB,b,f,c}^{PUSCH}(i))+\alpha_{b,f,c}(j)\cdot PL_{b,f,c}(q_d)+\Delta_{TF,b,f,c}(i)+f_{b,f,c}(i,l)\}$$

In Equation above, when performing PUSCH transmission at a time point i in a serving cell c (frequency f), PH(i) may be calculated based on the maximum reverse transmission power $P_{CMAX,f,c}(i)$, the number of resource blocks $M^{PUSCH}_{RB,b,f,c}(i)$, a power offset $\Delta_{TF,c}(i)$ derived from a MCS, a PL $PL_c$, and accumulated transmission power control (TPC) commands $f_c(i)$.

In Equation above, $PL_c$ may be a PL of a cell configured to provide a PL for the serving cell c. A PL used for determining reverse transmission power of any serving cell may be a PL of a forward channel of the serving cell or a PL of a forward channel of another cell. The BS may select which of the PLs to use and notify the UE of the selected PL via a message from an RRC layer. In a case that the UE uses multiple beams in one cell, the BS may notify the UE which beam or reference signal is to be selected for measurement and calculation.

In Equation above, $f_c(i)$ may be an accumulated value of the TPC commands from the serving cell c.

$P_{O\_PUSCH,c}$ may be a sum of cell-specific and UE-specific values as an upper layer parameter. In general, different values of $P_{O\_PUSH,C}$ may be applied according to a type of PUSCH transmission such as semi-persistent scheduling, dynamic scheduling, and a random access response.

$\alpha_c$ is a 3-bit cell-specific value provided via an upper layer and denotes a weight value applied to a PL in calculating a reverse transmission power (i.e., the larger the weight value is, the greater effect the PL has on the reverse transmission power), and a weight value that is applicable may be restricted according to the type of the PUSCH transmission.

The value of j is used to indicate the type of PUSCH. j=0 may indicate semi-persistent scheduling, j=1 may indicate dynamic scheduling, and j=2 may indicate a random access response.

In Equation above, in a case that there is no PUSCH transmission on a specific serving cell, $M_{PUSCH}$ and $\Delta_{TF}$ will not be applicable to the above equation as defined thereby.

Moreover, $P_{CMAX,f,c}$, which is a UE maximum transmission power of serving cell c (at frequency f), may be determined between $P_{CMAX\_L,f,c}$ and $P_{CMAX\_H,f,c}$ as shown in Equation below or by using Equation corresponding thereto.

$P_{CMAX\_L,f,c} \leq P_{CMAX,f,c} \leq P_{CMAX\_H,f,c}$ with
$P_{CMAX\_L,f,c} = \text{MIN } \{P_{EMAX,c} - \Delta T_{C,c},$ $(P_{PowerClass} - \Delta P_{PowerClass}) - \text{MAX}(\text{MAX}(MPR_c, A\text{-}MPR_c) + \Delta T_{IB,c} + \Delta T_{c,c} + \Delta T_{RxSRS}, P\text{-}MPR_c)\}$
$P_{CMAX\_H,f,c} = \text{MIN } \{P_{EMAX,c}, P_{PowerClass} - \Delta P_{PowerClass}\}$ In Equation above, $P_{CMAX\_H,f,c}$ that is a maximum value of $P_{CMAX,f,c}$ may be determined as a minimum value among a value of $P_{EMAX,c}$ that can be directly transmitted by the BS and a value of $P_{PowerClass} - \Delta P_{PowerClass}$ that are determined for each frequency band.

Furthermore, in Equation above, $P_{CMAX\_L,f,c}$ which is a minimum value of $P_{CMAX,f,c}$ may be determined based on a value by which each of the maximum values is reduced according to an additional factor. For example, the value of $P_{EMAX,c}$, which can be directly transmitted by the BS, may be reduced by $\Delta T_{C,c} = 1.5$ dB according to band-specific requirements, and the minimum value of the UE maximum transmission power, may be reduced based on a larger one among a value obtained by considering maximum power reduction ($MPR_c$) that is determined according to transmission modulation and a transmission bandwidth for the UE, an additional maximum power reduction ($A\text{-}MPR_c$) value (or called a network signaling (NS) value) determined according to signaling that the BS additionally transmits to the UE in order to reduce interference from neighboring bands, etc., and a power management maximum power reduction ($P\text{-}MPR_c$) value used for reducing a transmission power in order to meet a required value when electromagnetic wave energy is absorbed into the human body. For example, in a system operating at a high frequency, such as an NR system, the UE may perform transmission at high power, but if the transmission is performed at high power, such high power transmission may be harmful to the human body, and thus, a maximum transmission value may be adjusted according to the required value for regulating the high power transmission. A case where an actual transmission power is controlled by lowering the minimum value of the maximum transmission power according to the $P\text{-}MPR_c$ value as described above may be referred to as power backoff that occurs due to power management.

When the multiple entry PHR MAC CE format is used, the UE may indicate a serving cell for which a PH is reported via a bitmap 1e-33, and report PHs for a serving cell indicated in the bitmap 1e-33 and serving cells for which a PH is unconditionally reported, and when a report is required, the UE may report a corresponding $P_{CMAX,f,c}$ value together. Moreover, when the UE reports a PH, the UE may report the PH by using a field having a length of 6 bits as shown in FIG. 1E, and in NR, according to frequency ranges (e.g., frequency ranges below and above 7.125 GHz are respectively referred to as FR1 and FR2) in which the BS operates, a PH may have a range of −23 dB to 40 dB in FR2 while having a range of −13 dB to 50 dB in FR1.

For a multiple entry PHR MAC CE, a P bit 1e-35 and a virtual (V) bit 1e-37 may be additionally included.

In the case of the P bit, when a maximum transmission power value of a corresponding serving cell becomes less than an original value by applying power backoff due to power management, the UE may report a PHR to the BS by setting the P bit to 1 to thereby inform the BS that a $P_{CMAX,f,c}$ value reported by the UE for the corresponding serving cell has been adjusted due to the power backoff.

In the case of the V bit, at a time point when the UE reports the multiple entry PHR MAC CE, there will be cases where real UL data transmission is performed or is not performed on each serving cell according to scheduling information, and for real transmission, the V bit is set to 0, and a PH value is calculated and reported according to the real transmission whereas when the real transmission is not performed, the V bit is set to 1 and a value calculated under the assumption that predetermined virtual transmission has been performed is reported as PH. The virtual transmission is referred to as a PUSCH reference format or virtual format.

Accordingly, when the UE transmits a PHR for each cell configured by the current BS for the UE and activated, even if the same PH report field is used in the multiple entry PHR format according to a radio access technology (RAT) and an operating frequency of a corresponding serving cell, the UE may generate a value by using Table according to a type of the corresponding serving cell and report the value to the BS.

Conditions for when the PHR is transmitted to the BS (i.e., whether the PHR is to be triggered) may be defined, and the following conditions may be defined and applied in LTE and NR systems:

Condition 1: DL reception strength of a serving cell belonging to any MAC entity configured for a UE has changed more than or equal to phr-Tx-PowerFactorChange dB in a state where prohibitPHR-Timer has expired.

In other words, from an MCG perspective in the DC scenario, even when a signal strength change occurs in one of serving cells of an SCG, the PHR is reported for the MCG.

Condition 2: A phr-PeriodicTimer used in any MAC entity expires.

Condition 3: A PHR is initially configured.

Condition 4: SCell including a UL belonging to any MAC entity is activated.

Condition 5: A PSCell of an SCG is added or changed when a DC technology is used.

Condition 6: When there are resources for transmission via UL of a serving cell belonging to any MAC entity configured for the UE in a state where a prohibitPHR-Timer has expired, a required amount by which a transmission power has to be reduced according to power backoff due to the power management is greater than or equal to phr-Tx-PowerFactorChange dB as compared to a previous value reported via the PHR MAC CE.

When a PHR triggering condition occurs in each BS as defined in the above conditions, the UE may generate a PH and report the PH to the corresponding BS.

Figure 1F:
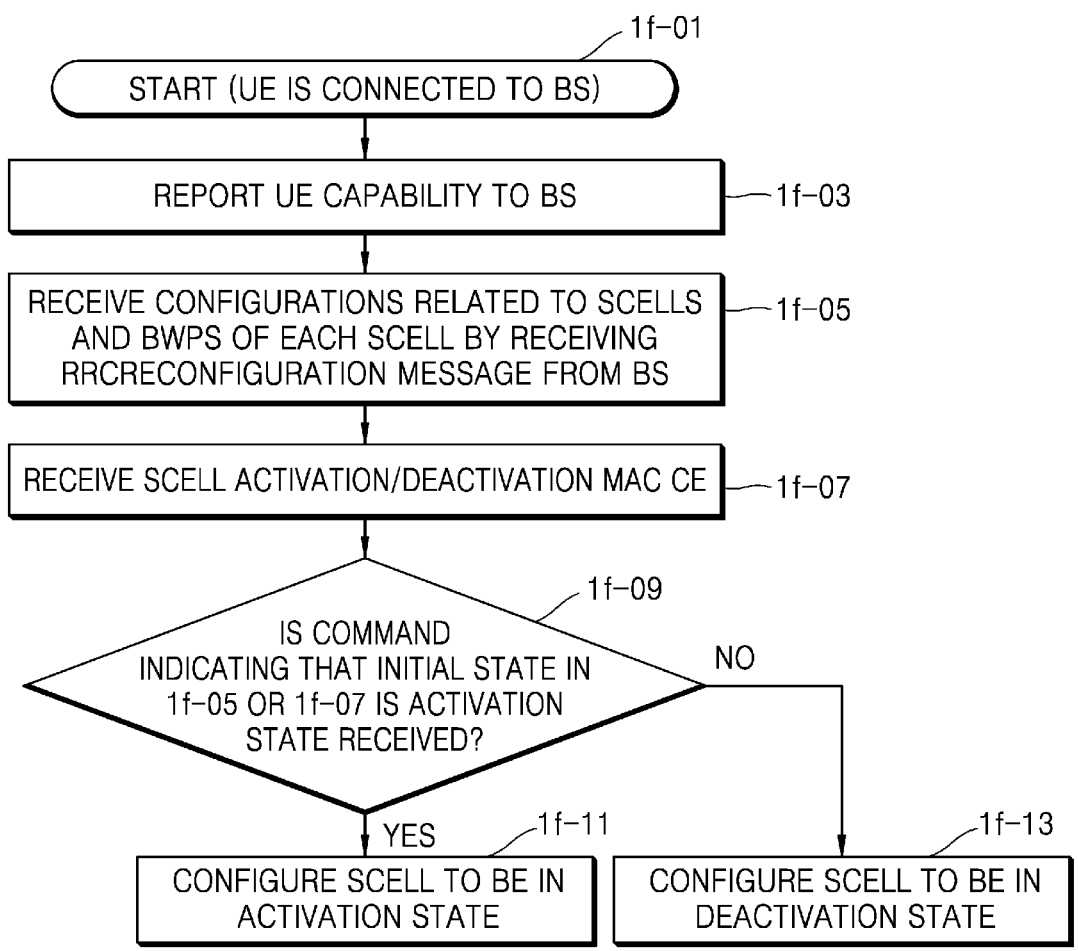
FIG. 1F is a flowchart illustrating the sequence of operations of a terminal when the terminal is configured with a secondary cell (SCell) and the SCell is activated, according to an embodiment of the present disclosure.

FIG. 1F is a flowchart illustrating the sequence of operations of a UE when the UE is configured with a SCell and the Scell is activated, according to an embodiment of the present disclosure.

In FIG. 1F, the UE may be in a situation (1f-01) after performing access to the BS and establishing a connection with the BS. That is, by performing a random access procedure with the BS for reasons such as reception of a paging message from the BS or occurrence of data to be transmitted in the UL, the UE may transition from the RRC_IDLE state to the RRC_CONNECTED state.

When the UE initially accesses a network or when an AMF for managing the UE is changed, the UE may transmit UE capability information to the BS upon request from the BS (1f-03). The UE capability information may include information about functions the UE supports, and the BS may configure the UE with a function desired by the BS among the functions supported by the UE. Examples of the UE capability information may include information about whether the dormant BWP is supported. In addition, the UE capability information may include 1 bit for each of FR1 and FR2. However, the UE capability information is not limited to the above examples, and may include all pieces of information about capabilities of the UE.

Thereafter, the UE may receive various configuration information from BS via an RRC layer message (1f-05). The RRC layer message may be, for example, an RRCReconfiguration message, and the configuration information received by the UE from the BS may include a configuration for adding (or releasing) one or a plurality of SCells together with the current PCell. Furthermore, when SCells are added in the configuration information, detailed configurations of BWPs may be received for each SCell. In this case, one of the configured BWPs may be a dormant BWP. Furthermore, one of the configured BWPs may be a default BWP or an initial BWP (BWP #0) when the default BWP is not configured. In addition, the UE may be configured by the BS with a first active BWP which is a BWP activated for the first time when a corresponding SCell is activated, and the first active BWP may be the dormant BWP or a normal BWP on which normal data can be transmitted and received.

Also, timer 1(sCellDeactivationTimer) and timer 2 (bwp-InactivityTimer) may be configured for each SCell. Timer 1 may be a timer configured to transition a SCell to a deactivation state when there is no data transmission/reception on the SCell while timer 1 expires. In other words, when timer 1 expires, the UE deactivates the corresponding SCell. In addition, in a case that a current active BWP in the SCell is not a default BWP, timer 2 may be a timer for switching the active BWP to a default BWP when there is no data transmission and reception on the current active BWP. The data transmission and reception means a case where a PDCCH is transmitted on a corresponding BWP, a PDCCH for the corresponding BWP is transmitted, or data transmission is performed in a configured UL or DL. When the default BWP is not configured, the UE switches the BWP to the initial BWP (BWP #0). In other words, when timer 2 expires, the UE switches the active BWP of the corresponding SCell to the dormant BWP (the initial BWP if not configured).

In the RRCReconfiguration message, the BS may indicate to the UE whether an initial state of each SCell is an activation state or a deactivation state.

Thereafter, the UE may receive a SCell Activation/Deactivation MAC CE among MAC CEs that are control messages from the MAC layer in order to change a state of the SCell configured by the BS (1f-07). The SCell Activation/Deactivation MAC CE may include a bitmap indicating activation or deactivation for each SCell.

The UE may determine whether to activate the corresponding SCell via the RRC layer message or both the RRC layer message and the SCell Activation/Deactivation MAC CE (1f-09). Based on this, the UE may perform the following operation related to activation (1f-11), and if deactivated, the UE may configure the SCell to be in a deactivation state (1f-13).

In the above operation, for the SCell whose initial state is configured to be in an activation state by the RRC layer message, the UE determines whether a first active BWP of the corresponding SCell configured by the BS is a dormant BWP. When the first active BWP is not the dormant BWP, the UE may start the timer 1. Also, timer 2 may be started. However, when the first active BWP is the dormant BWP, the UE may not start the timer 1. Also, the UE may not also start timer 2. This is because if the timer 1 and timer 2 starts when the active BWP for the UE is a dormant BWP, the SCell is unnecessarily deactivated or switching to a normal BWP occurs and this does not meet the original purpose of the dormant BWP which is maintained in a dormant state for a long time period and can be switched only when necessary.

Moreover, when the UE receives the SCell Activation/Deactivation MAC CE from the BS, the UE may activate the Scell if a bit corresponding to the SCell is set to 1 and deactivate the Scell if the bit is set to 0. In this case, the following operation is performed for SCells having a corresponding bit set to 1.

When the SCell is in the deactivation state before the SCell Activation/Deactivation MAC CE message is received, the UE determines whether a first active BWP of the corresponding SCell is a dormant BWP. When the first active BWP is not the dormant BWP, the UE may start the timer 1. Also, the UE may start the timer 2. However, when the first active BWP is the dormant BWP, the UE may not start the timer 1. Also, the UE may not also start the timer 2. This is because if the timer 1 and timer 2 starts when the active BWP for the UE is a dormant BWP, the SCell is unnecessarily deactivated or switching to a normal BWP occurs. This does not meet the purpose of the dormant BWP which is maintained in a dormant state for a long time period and can be switched to a non-dormant state only when necessary. In other words, when the UE receives a command for activating the SCell in the deactivation state, the UE may not start the timer 1 and timer 2 if the first active BWP is the dormant BWP but start the timer 1 as well as the time 2 if the first active BWP is not the dormant BWP. In addition, when the UE receives a command for activating an already activated SCell again, the UE may not start the timer 1 and timer 2 if the first active BWP is the dormant BWP but start the timer 1 as well as the time 2 if the first active BWP is not the dormant BWP.

Also, when there is a SCell that is activated upon receiving the SCell Activation/Deactivation MAC CE message, a PHR is also triggered as described above. In this case, the UE may determine a PH type (Type 1/2/3) and a PH value for each serving cell.

In the case of SCells for which no PUSCH is configured but only an SRS is configured in all UL BWPs among activated SCells, the UE reports Type 3 PH for the corresponding SCells. Among the remaining SCells other than the SCells, when a corresponding SCell was previously in the deactivation state, the UE determines whether there are SCells for which a PUSCH is configured in at least one UL BWP and the first Active BWP is the dormant BWP. When there is a SCell that satisfies the above conditions, the UE reports Type 3 PH for the SCell if an SRS is configured in a dormant BWP of the SCell and reports Type 1 PH if an SRS is not configured in the dormant BWP of the SCell (in this case, the UE reports a virtual value; i.e., setting a V field to 1 for the SCell). Alternatively, as described above, when the (first) active BWP is the dormant BWP, the UE may always report Type 1 PH regardless of whether the SRS is configured, and in this case, the UE reports a virtual value. In other words, for a SCell where an active BWP is a dormant BWP when a PHR is reported, the UE always transmits Type 1 PH in a virtual format. Furthermore, the UE may report Type 1 PH for other activated SCells, and report a real or virtual value according to resource allocation at the time of reporting a PH.

In addition, for SCELLs that is activated but receives a deactivation command (i.e., a bit set to 0) via the SCell Activation/Deactivation MAC CE message, the UE may determine whether the current active BWP is the dormant BWP and stop the timer 1 and the timer 2 for a SCell where the current active BWP is not a dormant BWP.

Figure 1G:
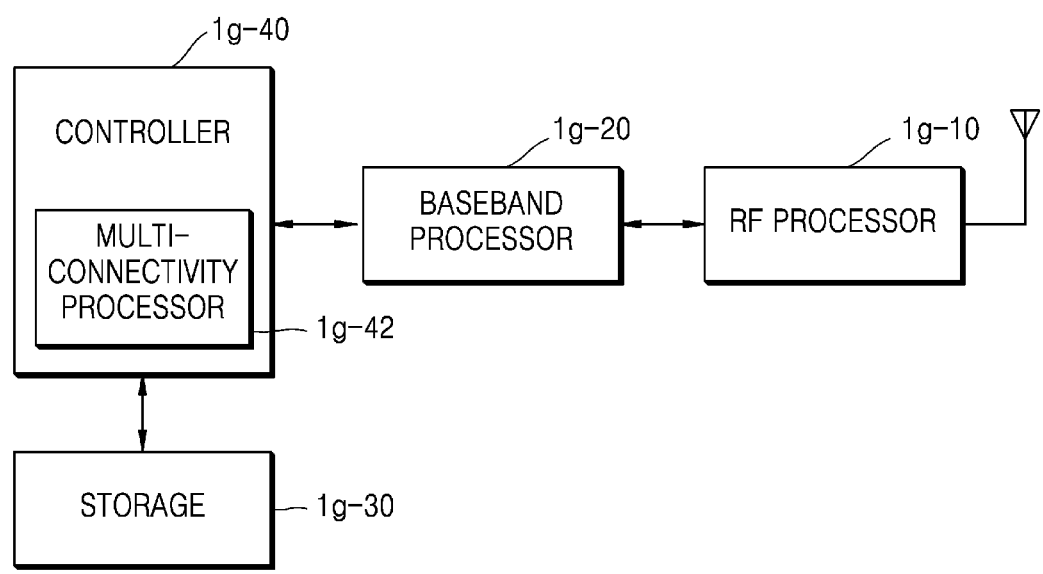
FIG. 1G is a block diagram of a configuration of a terminal in a wireless communication system, according to an embodiment of the present disclosure.

FIG. 1G is a block diagram of a configuration of a UE in a wireless communication system, according to an embodiment of the present disclosure.

Referring to FIG. 1G, the UE may include a radio frequency (RF) processor 1g-10, a baseband processor 1g-20, a storage 1g-30, and a controller 1g-40. However, the UE is not limited to the above example but include fewer or more components than those illustrated in FIG. 1G.

The RF processor 1g-10 may perform a function for transmitting and receiving a signal via a radio channel, such as signal conversion between bands and amplification. In detail, the RF processor 1g-10 up-converts a baseband signal from the baseband processor 1g-20 into an RF signal and then transmits the RF signal via an antenna, and down-converts an RF signal received via the antenna into a baseband signal. For example, the RF processor 1g-10 may include a transmit filter, a receive filter, an amplifier, a mixer, an oscillator, a digital to analog convertor (DAC), an analog to digital convertor (ADC), etc. Although only one antenna is shown in FIG. 1G, the UE may include a plurality of antennas. The RF processor 1g-10 may also include multiple RF chains. Furthermore, the RF processor 1g-10 may perform beamforming. For beamforming, the RF processor 1g-10 may adjust a phase and a magnitude of each of the signals transmitted and received through multiple antennas or antenna elements.

The baseband processor 1g-20 performs a function for conversion between a baseband signal and a bit string according to a physical layer standard of a system. For example, when transmitting data, the baseband processor 1g-20 generates complex symbols by encoding and modulating a transmission bit string. Furthermore, when receiving data, the baseband processor 1g-20 reconstructs a reception bit string by demodulating and decoding a baseband signal from the RF processor 1g-10. For example, according to an OFDM scheme, when transmitting data, the baseband processor 1g-20 generates complex symbols by encoding and modulating a transmission bit string, maps the complex symbols to subcarriers, and then generates OFDM symbols through inverse fast Fourier transform (IFFT) operations and cyclic prefix (CP) insertion. Furthermore, when receiving data, the baseband processor 1g-20 divides the baseband signal from the RF processor 1g-10 into OFDM symbols, recovers signals mapped to subcarriers through FFT operations, and then reconstructs a reception bit string through demodulation and decoding.

The baseband processor 1g-20 and the RF processor 1g-10 each transmits or receives signals as described above. Thus, the baseband processor 1g-20 and the RF processor 1g-10 may be referred to as a transmitter, receiver, transceiver, or communicator. Furthermore, at least one of the baseband processor 1g-20 and the RF processor 1g-10 may include multiple communication modules to support a plurality of different RATs. In addition, at least one of the baseband processor 1g-20 and the RF processor 1g-10 may include different communication modules to process signals in different frequency bands. For example, the different RATs may include a wireless local area network (WLAN) technology (e.g., Institute of Electrical and Electronics Engineers (IEEE) 802.11), a cellular network technology (e.g., LTE), etc. The different frequency bands may include super-high frequency (SHF) bands (e.g., 2.5 GHz and 5 GHz) and millimeter (mm)-wave bands (e.g., 60 GHz). The UE may transmit and receive a signal to and from a BS via the baseband processor 1g-20 and the RF processor 1g-10, and the signal may include control information and data.

The storage 1g-30 stores basic programs, application programs, and data such as configuration information for operations of the UE. In particular, the storage 1g-30 may store information related to a WLAN node for performing wireless communication using a WLAN access technology. The storage 1g-30 also provides stored data at the request of the controller 1g-40. The storage 1g-30 may be composed of storage media, such as read-only memory (ROM), random access memory (RAM), hard discs, compact disc (CD)-ROM, and digital versatile discs (DVDs), or a combination thereof. Furthermore, the storage 1g-30 may include a plurality of memories. In an embodiment of the present disclosure, the storage 1g-30 may store a program for performing a method of determining whether to start a timer related to BWP switching and state transition according to a type of a BWP (a dormant BWP or a normal BWP) activated in a SCell configured according to indication by the BS according to the present disclosure.

The controller 1g-40 controls all operations of the UE. For example, the controller 1g-40 transmits or receives signals via the baseband processor 1g-20 and the RF processor 1g-10. The controller 1g-40 also writes and reads data to and from the storage 1g-40. To do so, the controller 1g-40 may include at least one processor. For example, the controller 1g-40 may include a communication processor (CP) for performing control for communication and an application processor (AP) for controlling upper layers such as application programs. Furthermore, at least one component in the UE may be implemented as a single chip. In addition, according to an embodiment of the present disclosure, the controller 1g-40 may include a multi-connectivity processor 1g-42 that performs processing for operating in a multi-connectivity mode. For example, the controller 1g-40 may control the UE to perform a procedure for the operations of the UE illustrated in FIG. 1F.

According to an embodiment of the present disclosure, the controller 1g-40 may determine whether to start a timer related to BWP switching and state transition according to a type of a BWP (a dormant BWP or a normal BWP) activated in a SCell configured according to indication by the BS.

Figure 1H:
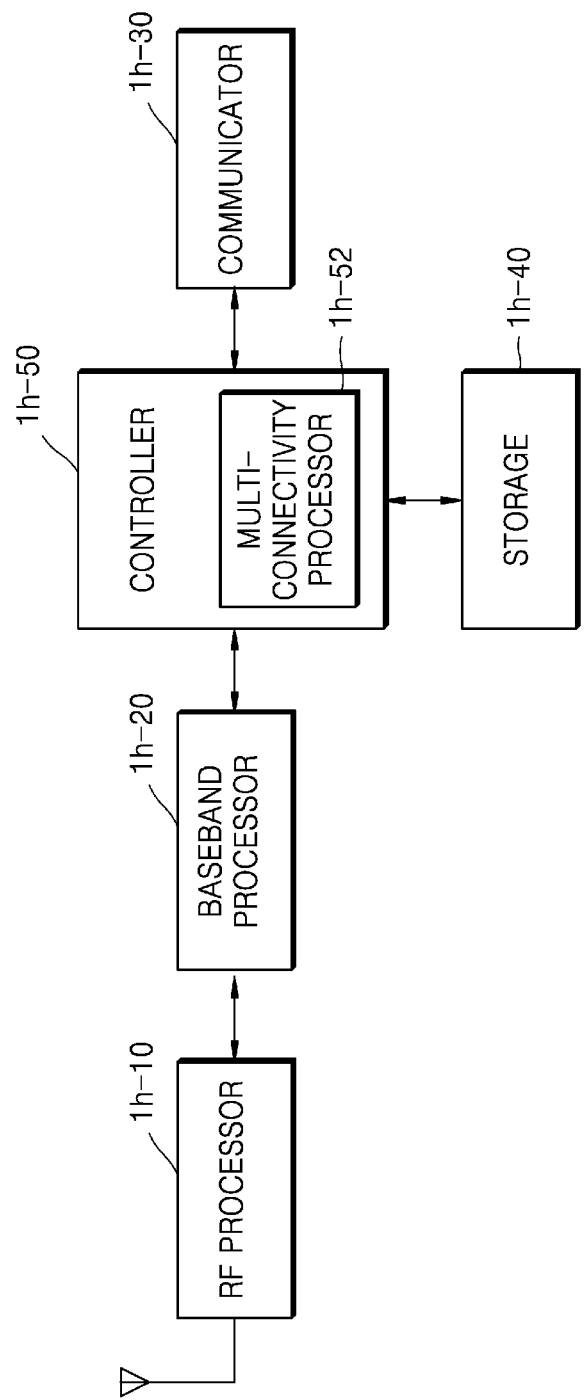
FIG. 1H is a block diagram of a configuration of a base station in a wireless communication system, according to an embodiment of the present disclosure.

FIG. 1H is a block diagram of a configuration of a BS in a wireless communication system, according to an embodiment of the present disclosure.

Referring to FIG. 1H, the BS may include an RF processor 1h-10, a baseband processor 1h-20, a communicator 1h-30, a storage 1h-40, and a controller 1h-50. However, the BS is not limited to the above example but include fewer or more components than those illustrated in FIG. 1H.

The RF processor 1h-10 performs a function for transmitting and receiving a signal via a radio channel, such as signal conversion between bands and amplification. In detail, the RF processor 1h-10 may up-convert a baseband signal from the baseband processor 1h-20 into an RF signal and then transmit the RF signal via an antenna, and down-convert an RF signal received via the antenna into a baseband signal. For example, the RF processor 1h-10 may include a transmit filter, a receive filter, an amplifier, a mixer, an oscillator, a DAC, an ADC, etc. Although only one antenna is shown in FIG. 1H, the RF processor 1h-10 may include a plurality of antennas. Furthermore, the RF processor 1h-10 may include multiple RF chains. Furthermore, the RF processor 1h-10 may perform beamforming. For beamforming, the RF processor 1h-10 may adjust a phase and magnitude of each of the signals transmitted and received through multiple antennas or antenna elements. Furthermore, the RF processor 1h-10 may perform a DL MIMO operation by transmitting one or more layers.

The baseband processor 1h-20 may perform a function for conversion between a baseband signal and a bit string according to a physical layer standard of a RAT. For example, when transmitting data, the baseband processor 1h-20 may generate complex symbols by encoding and modulating a transmission bit string. Furthermore, when receiving data, the baseband processor 1h-20 may reconstruct a reception bit string by demodulating and decoding a baseband signal from the RF processor 1h-10. For example, according to an OFDM scheme, when transmitting data, the baseband processor 1h-20 may generate complex symbols by encoding and modulating a transmission bit string, map the complex symbols to subcarriers, and then generate OFDM symbols through IFFT operations and CP insertion. Furthermore, when receiving data, the baseband processor 1h-20 may divide the baseband signal from the RF processor 1h-10 into OFDM symbols, recover signals mapped to subcarriers through FFT operations, and then reconstruct a reception bit string through demodulation and decoding. The baseband processor 1h-20 and the RF processor 1h-10 transmit and receive signals as described above. Thus, the baseband processor 1h-20 and the RF processor 1h-10 may be referred to as a transmitter, receiver, transceiver, communicator, or wireless communicator. The BS may transmit and receive a signal to and from the UE via the baseband processor 1h-20 and the RF processor 1h-10, and the signal may include control information and data.

The communicator 1h-30 may provide an interface to communicate with other nodes in the network. For example, the communicator 1h-30 may convert a bit string to be transmitted from a primary BS to another node, such as a secondary BS and a CN, into a physical signal, and may convert a physical signal received from the other node into a bit string. The communicator 1h-30 may be a backhaul communicator.

The storage 1h-40 stores basic programs, application programs, and data such as configuration information for operations of the BS. The storage 1h-40 may store information about bearers allocated to a connected UE, measurement results reported by the connected UE, etc. Furthermore, the storage 1h-40 may store information that is a criterion for determining whether to provide or terminate multiple connectivity to or from the UE. The storage 1h-40 also provides stored data at the request of the controller 1h-50. The storage 1h-40 may be composed of storage media, such as ROM, RAM, hard discs, CD-ROM, and DVDs, or a combination thereof. Furthermore, the storage 1h-40 may include a plurality of memories. According to some embodiments, the storage 1h-40 may store programs for performing a two-step random access procedure and a method of configuring, generating, and transmitting the MsgB format.

The controller 1h-50 controls all operations of the BS. For example, the controller 1h-50 transmits or receives signals through the baseband processor 1h-20 and the RF processor 1h-10 or through the communicator 1h-30. Furthermore, the controller 1h-50 writes and reads data to and from the storage 1h-40. To do so, the controller 1h-50 may include at least one processor. According to an embodiment of the present disclosure, the controller 1h-50 includes a multi-connectivity processor 1h-52 that performs processing for operating in a multi-connectivity mode.

In addition, at least one component in the BS may be implemented as a single chip. Each component of the BS may perform operations according to the embodiments of the present disclosure.

Methods according to embodiments of the present disclosure described in the appended claims or specification thereof may be implemented in hardware, software, or a combination of hardware and software.

When the methods are implemented in software, a computer-readable storage medium having at least one program (software module) stored therein may be provided. The at least one program stored in the computer-readable storage medium is configured for execution by at least one processor within an electronic device. The at least one program includes instructions that cause the electronic device to execute the methods according to the embodiments of the present disclosure described in the claims or specification thereof.

The program (software module or software) may be stored in RAM, non-volatile memory including a flash memory, ROM, EEPROM, magnetic disc storage devices, CD-ROM, DVDs or other types of optical storage devices, and magnetic cassettes. Alternatively, the program may be stored in a memory that is configured as a combination of some or all of the stated devices. A plurality of such memories may be included.

Furthermore, the program may be stored in an attachable storage device that may be accessed through communication networks such as the Internet, Intranet, a LAN, a wide LAN (WLAN), and a storage area network (SAN) or a communication network configured in a combination thereof. The storage device may connect to a device for performing the methods according to the embodiments of the present disclosure via an external port. In addition, a separate storage device on the communication network may also connect to a device for performing the methods according to the embodiments of the present disclosure.

In the specific embodiments of the present disclosure, a component included in the present disclosure is expressed in a singular or plural form depending on the presented specific embodiments. However, singular or plural expressions are selected to be suitable for the presented situations for convenience of descriptions, and the present disclosure is not limited to elements in a singular or plural form, i.e., an element expressed in a plural form may be configured as a single element, or an element expressed in a singular form may be configured as a plurality of elements.

Moreover, although specific embodiments have been described in the detailed description of the present disclosure, various modifications may be made therein without departing from the scope of the present disclosure. Thus, the scope of the present disclosure should not be limited to the described embodiments but be defined by the following claims as well as their equivalents. It is obvious to those of ordinary skill in the art that other modifications based on the technical spirit of the present disclosure are implementable. The embodiments may be combined with each other for operation when necessary. For example, parts of the methods presented in the present disclosure may be combined with one another to operate a BS and a UE. Although the embodiments are proposed based on a 5G or NR system, other modifications based on the technical spirit of the embodiments may be applicable to other systems such as LTE, LTE-A, and LTE-A-Pro systems.

The invention claimed is:

1. A method, performed by a terminal, of controlling at least one of a secondary cell (SCell), the method comprising:
receiving a radio resource control (RRC) message including first information about a first timer for deactivation of the SCell, second information about a second timer, state information of the SCell, third information configuring a first active bandwidth part (BWP) and fourth information configuring a dormant BWP, wherein the second timer is a timer for switching to a default BWP;
identifying whether the SCell is activated or not based on the RRC message; and
identifying whether the first active BWP of the SCell is the dormant BWP based on the third information and the fourth information,
wherein the second timer is controlled not to run, based on the first active BWP of the SCell being the dormant BWP, and the state information of the SCell being set to active in the RRC message, and
wherein the second timer is controlled to run, based on the first active BWP of the SCell not being the dormant BWP and the state information of the SCell being set to active in the RRC message.

2. The method of claim 1,
wherein the RRC message includes information indicating the default BWP or an initial BWP of the SCell,
wherein the first active BWP is a BWP activated for a first time, and
wherein one of BWPs of the Scell includes the dormant BWP.

3. The method of claim 2,
wherein the first timer is sCellDeactivationTimer, and the second timer is bwp-InactivityTimer, and
wherein the method further comprises:
performing an operation for transitioning the SCell to a deactivation state due to expiry of the first timer, and
performing an operation for switching an active BWP of the SCell to the default BWP or the initial BWP in case of expiration of the second timer.

4. The method of claim 1,
wherein the first timer expires when data transmission and reception is not performed for a certain time period via the SCell that is in an activation state, and
wherein, based on an active BWP not being the default BWP, the second timer expires when data transmission and reception is not performed on the active BWP.

5. The method of claim 1, further comprising:
starting the first timer when the SCell is activated.

6. The method of claim 1, further comprising:
receiving a media access control (MAC) control element (CE) for changing a state of at least one of the SCell; and,
identifying whether the SCell is activated or not based on the RRC message and the MAC CE,
wherein the second timer is controlled not to run, based on the first active BWP of the SCell being the dormant BWP and the SCell having been deactivated prior to receiving the MAC CE activating the SCell, and
wherein the second timer is controlled to run, based on the first active BWP of the SCell not being the dormant BWP and the SCell having been deactivated prior to receiving the MAC CE activating the SCell.

7. A method, performed by a base station, of controlling at least one of a secondary cell (SCell), the method comprising:
transmitting a radio resource control (RRC) message including first information about a first timer for deactivation of the SCell, second information about a second timer, state information of the SCell, third information indicating a first active bandwidth part (BWP) and fourth information configuring a dormant BWP, wherein the second timer is a timer for switching to a default BWP,
wherein the RRC message is used to identify whether the SCell is activated or not,
wherein the third information and the fourth information are used to identify whether the first active BWP of the SCell is the dormant BWP,
wherein the second timer is controlled not to run, based on the first active BWP of the SCell being the dormant BWP, and the state information of the SCell being set to active in the RRC message, and
wherein the second timer is controlled to run, based on the first active BWP of the SCell not being the dormant BWP and the state information of the SCell being set to active in the RRC message.

8. The method of claim 7,
wherein the RRC message includes information indicating the default BWP or an initial BWP of the SCell, and
wherein the first active BWP is a BWP activated for a first time, and
wherein one of BWPs of the SCell includes the dormant BWP.

9. The method of claim 7,
wherein the SCell is transitioned to a deactivation state in case of expiration of the first timer and an active BWP of the SCell is switched to the default BWP or an initial BWP in case of expiration of the second timer.

10. The method of claim 7, further comprising:
transmitting a media access control (MAC) control element (CE) for changing a state of at least one of the SCell, wherein the RRC message and the MAC CE are used to determine whether the SCell is activated or not,
wherein the second timer is controlled not to run, based on the first active BWP of the SCell being the dormant BWP and the SCell having been deactivated prior to receiving the MAC CE activating the SCell, and
wherein the second timer is controlled to run, based on the first active BWP of the SCell not being the dormant BWP and the SCell having been deactivated prior to receiving the MAC CE activating the SCell.

11. A terminal for controlling at least one of a secondary cell (SCell), the terminal comprising:
a transceiver; and
a processor combined with the transceiver and configured to:
receive a radio resource control (RRC) message including first information about a first timer for deactivation of the SCell, second information about a second timer, state information of the SCell, third information indicating a first active bandwidth part (BWP), and fourth information configuring a dormant BWP, wherein the second timer is a timer for switching to a default BWP,
identify whether the SCell is activated or not based on the RRC message, and
identify whether the first active BWP of the SCell is the dormant BWP based on the third information and the fourth information,
wherein the second timer is controlled not to run, based on the first active BWP of the SCell being the dormant BWP, and the state information of the SCell being set to activated in the RRC message, and
wherein the second timer is controlled to run, based on the first active BWP of the SCell not being the dormant BWP and the state information of the SCell being set to active in the RRC message.

12. The terminal of claim 11,
wherein the RRC message includes information indicating the default BWP or an initial BWP of the SCell,
wherein the first active BWP is a BWP activated for a first time, and
wherein one of BWPs of the SCell includes the dormant BWP.

13. The terminal of claim 12,
wherein the first timer is sCellDeactivationTimer, and the second timer is bwp-InactivityTimer, and
wherein the processor is further configured to:
perform an operation for transitioning the SCell to a deactivation state due to expiry of the first timer, and
perform an operation for switching an active BWP of the SCell to the default BWP or the initial BWP in case of expiration of the second timer.

14. The terminal of claim 11, wherein the processor is further configured to:
start the first timer when the SCell is activated.

15. A base station for controlling at least one of a secondary cell (SCell), the base station comprising:
a transceiver; and
a processor combined with the transceiver and configured to:
transmit a radio resource control (RRC) message including first information about a first timer for deactivation of the SCell, second information about a second timer, state information of the SCell, third information indicating a first active bandwidth part (BWP), and fourth information configuring a dormant BWP, wherein the second timer is a timer for switching to a default BWP,
wherein the RRC message is used to identify the SCell is activated or deactivated,
wherein the third information and the fourth information are used to identify whether the first active BWP of the SCell is the dormant BWP,
wherein the second timer is controlled not to run, based on the first active BWP of the SCell being the dormant BWP, and the state information of the SCell being set to activated in the RRC message, and
wherein the second timer is controlled to run, based on the first active BWP of the SCell not being the dormant BWP and the state information of the SCell being set to active in the RRC message.

* * * * *